(No Model.)  2 Sheets—Sheet 1.
P. BLAKER.
HARROW.
No. 486,925. Patented Nov. 29, 1892.
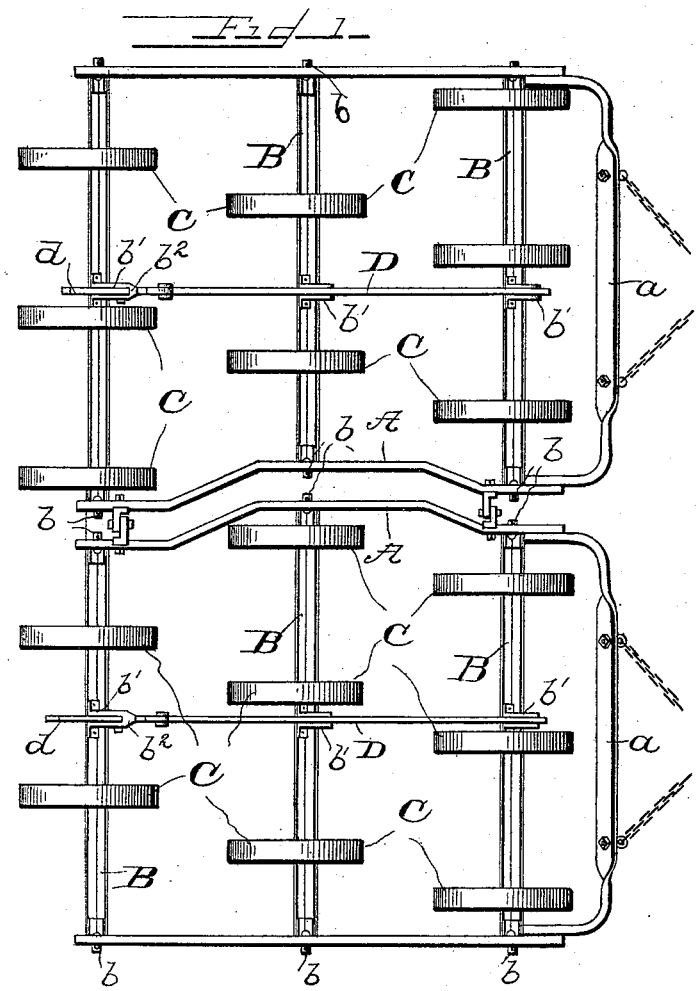
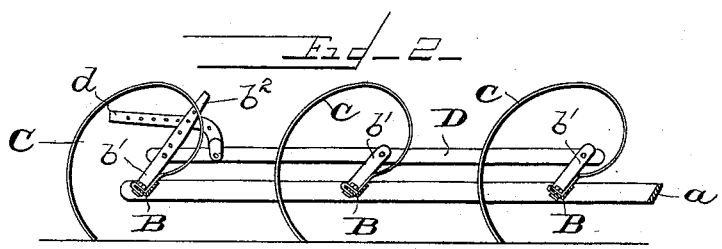
Witnesses
G. A. Tauberschmidt
Jesse Kingsbery
Inventor
Paul Blaker
By Whitaker & Prevost Attorneys.
THE NORRIS PETERS CO., PHOTO-LITHO., WASHINGTON, D. C.

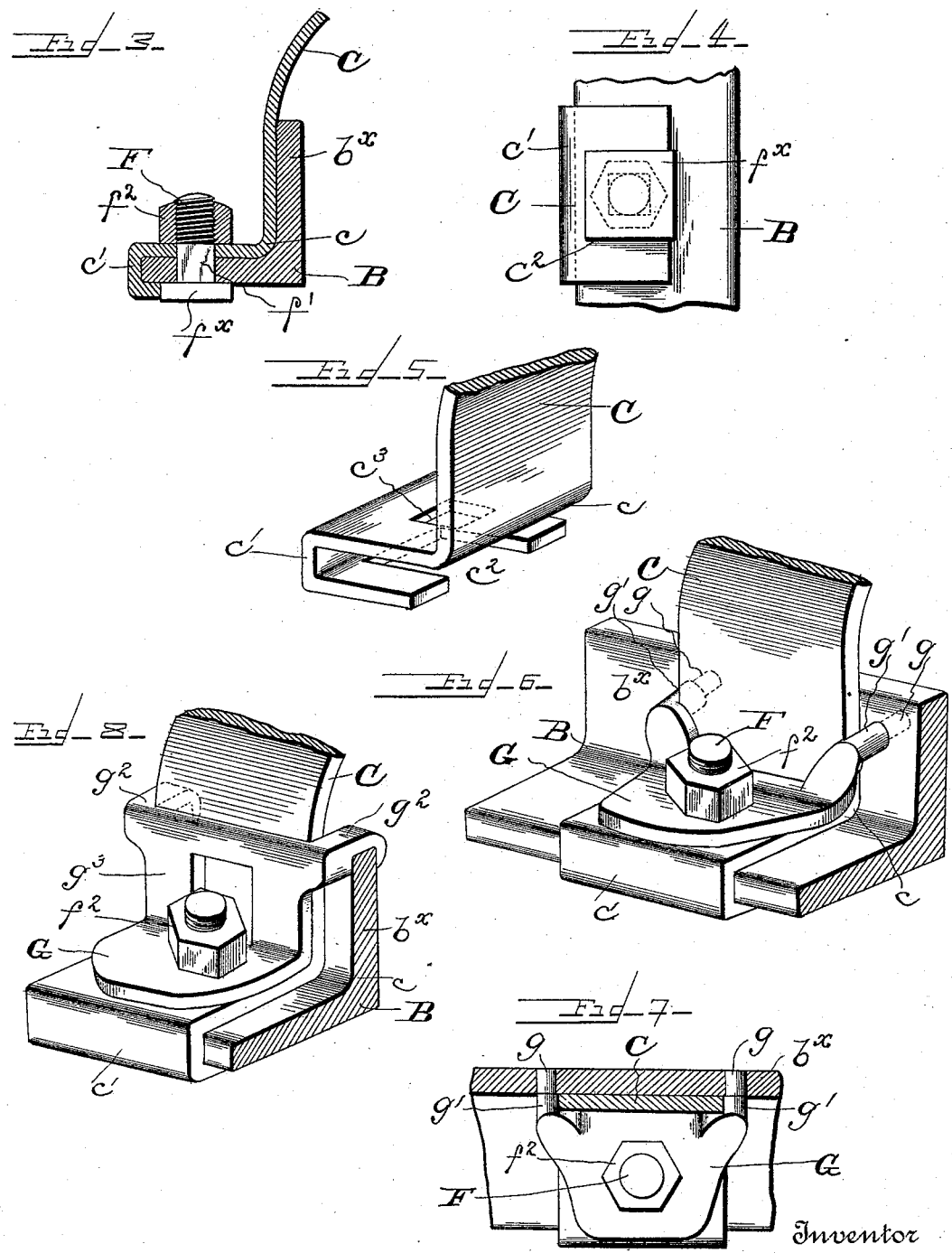

UNITED STATES PATENT OFFICE.

PAUL BLAKER, OF NEWTOWN, PENNSYLVANIA.

HARROW.

SPECIFICATION forming part of Letters Patent No. 486,925, dated November 29, 1892.

Application filed March 4, 1892. Serial No. 423,685. (No model.)

*To all whom it may concern:*

Be it known that I, PAUL BLAKER, a citizen of the United States, residing at Newtown, in the county of Bucks and State of Pennsylvania, have invented certain new and useful Improvements in Harrows; and I do hereby declare the following to be a full, clear, and exact description of the invention, such as will enable others skilled in the art to which it appertains to make and use the same.

My invention is an improvement in harrows; and it consists in the novel features of construction and combination of parts hereinafter fully described.

In the accompanying drawings I have illustrated a harrow embodying my invention, and said invention is fully disclosed in the following description and claims.

Referring to said drawings, Figure 1 is a top plan view of a harrow embodying one form of my invention. Fig. 2 is a longitudinal section on line $x\ x$ of Fig. 1. Fig. 3 is a sectional view of one of the pivoted tooth-bars, showing the method of attaching the tooth. Fig. 4 is a view of the under side of the tooth-bar and tooth-attaching devices. Fig. 5 is a detail perspective view of the end of the tooth which is secured to the tooth-bar. Fig. 6 is a detail perspective view of a portion of the tooth-bar, tooth, and one form of clip engaging the tooth. Fig. 7 is a top plan view of the said clip, the vertical portion of the tooth-bar being shown in section. Fig. 8 is a perspective view similar to Fig. 6, showing a slightly-modified form of clip.

In the drawings I have shown a harrow consisting of two parts or wings pivotally connected together, each part or wing having an open metallic frame A, provided with pivotally-mounted tooth-bars B B, disposed at right angles to the line of draft. I prefer to form the tooth-bars B of angle-iron, as shown, and to provide them adjacent to their ends with trunnions for engaging suitable bearings. To the tooth-bars B B are secured the spring-teeth C C in a manner presently to be described, and I also provide suitable means for varying the depth to which the teeth may be allowed to penetrate into the ground. To this end I provide each tooth-bar B with an arm $b'$, rigidly secured thereto, and I connect said arms $b'$ of each wing of the harrow by a longitudinally-extending bar D, which is pivotally secured to the said bars. I also provide adjusting devices for adjusting the bars D with respect to the harrow-frame A, and thereby adjusting all the teeth of the wing at once. Any preferred form of adjusting mechanism may be employed. I have shown the bar D provided with a pivoted arm $d$, having a series of apertures $d'$, the said arm engaging an extension $b^2$ of one of the arms $b'$, which extension is also provided with a series of apertures $b^3$. A pin may be placed in any of the apertures of the extension $b^2$ and arm $d$, thus securing the parts together and holding the tooth-bars in their adjusted positions. By removing the pin and replacing it in different apertures the tooth-bars and teeth can be adjusted so that the teeth will enter the ground any desired depth. The front bar $a$ of each of the wings of the harrow is for the greater part of its length bent at an angle to the horizontal plane of the harrow, as shown, so that when it strikes a stone or other obstruction it will ride over the same and prevent the bending or breaking of the bar.

In securing the teeth to the angle-iron tooth-bars I prefer to employ the following construction: The rear end of the tooth C is given a rearward bend at $c$, so that it will fit into the recess of the angle-bar, as seen in Fig. 3. The end portion of the tooth is then bent so as to fit over the edge of the angle-bar, as at $c'$, Fig. 6, and has its extremity extending beneath the said bar. The end of the tooth is also provided with a polygonal recess or aperture $c^2$, adapted to snugly fit and engage the head $f^\times$ of the securing-bolt F, which may be square, triangular, hexagonal, or of other desired form. The tooth is also provided with an aperture $c^3$, preferably polygonal, and the tooth-bar B is also provided with a polygonal aperture for the passage of the securing-bolt. The tooth having been placed in position on the tooth-bar, the securing-bolt F is passed up through the aperture in the bar and through the aperture $c^3$ in the tooth until the head $f^\times$ of the bolt, which is polygonal, as before stated, engages and fits in the recess or aperture $c^2$ in the end of the tooth. The bolt is also preferably provided with a polygonal body portion $f'$, which engages the polygonal recess in the bar and the recess $c^3$ in the tooth also, if desired. A nut $f^2$ is then placed on the bolt and turned up, and the tooth is thus very securely fastened to the bar and in such a manner as to make any side or lateral motion of the tooth impossible. The tooth, it will be observed, is held against lateral movement at three points by the square or polygonal head of the bolt, by the edges of the angle-iron engaging the tooth at $c'$, and by the vertically-disposed portion $b^x$ of the angle-iron, which engages the tooth above the bend $c$. This makes, therefore, a very secure and desirable fastening in which only one bolt is employed and in which side or twisting movements of the tooth, which would have a tendency to loosen the nuts $f^2$, are prevented. While I prefer to employ a bolt having a square or polygonal body portion, this is not an essential part of the construction.

In Figs. 6 and 7 I have shown a clip G for engaging the vertical portion of the tooth adjacent to the vertically-disposed wall $b^x$ of the tooth-bar B. This clip consists of a plate having a suitable aperture for engaging the securing-bolt F, the said plate being provided with two projecting arms $g\ g$, which enter recesses or apertures formed in the wall $b^x$ of the tooth-bar and are provided with bearing portions $g'\ g'$ to engage the tooth on each side and hold it rigidly against lateral movement. This clip might be employed with a tooth which was not provided with a part overlapping the edge of the tooth-bar, as indicated in dotted lines, or it may be used in connection with such form of tooth as shown in the drawings.

Instead of having the arms $g\ g$ of the clip pass through apertures in the wall $b^x$ of the angle tooth-bar, I may form the clip in such a manner that the arms may engage the upper edge of the wall $b^x$. In Fig. 8 I have shown such a form of clip, in which the arms $g^2\ g^2$ engage either side of the tooth, and are provided with hook portions which engage the upper edge of the wall $b^x$ of the tooth-bar. The arms $g^2\ g^2$ are connected to plate G by an intermediate wall $g^3$, which is preferably apertured to allow the nut $f^2$ to be turned. The intermediate wall might, however, be dispensed with, if desired, and arms $g^2\ g^2$ formed on plate G, and bent upward and forward, so as to engage the top of the wall $b^x$, as indicated in dotted lines.

What I claim, and desire to secure by Letters Patent, is—

1. In a harrow, the combination, with an angle tooth-bar, of a tooth having a portion adapted to fit the re-entrant angle of the bar and engage an edge and an outer side of said bar and securing means, substantially as described.

2. In a harrow, the combination, with an angle tooth-bar, of a tooth having a portion adapted to fit the re-entrant angle of the bar and having a portion engaging an edge and outer side of said bar and a securing-bolt having a polygonal head for engaging a recess in the portion of said tooth engaging the outer side of said bar, substantially as described.

3. In a harrow, the combination, with an angle tooth-bar, of a tooth having a portion adapted to fit the re-entrant angle of the tooth-bar and having a portion engaging an edge and outer side of said bar and a securing-bolt having a polygonal head to engage a polygonal recess in the portion of said tooth engaging the outer side of said bar, said bolt having a polygonal body for engaging a polygonal recess in the bar, substantially as described.

4. In a harrow, the combination, with an angle tooth-bar, of a tooth having a portion adapted to fit the re-entrant angle of the bar and a clip adapted to engage the tooth on the side opposite the bar-engaging portion of the tooth, said clip having bar-engaging portions extending on each side of the tooth, substantially as described.

5. In a harrow, the combination, with an angle tooth-bar, of a tooth having a portion adapted to fit the re-entrant angle of the bar and a clip adapted to engage the tooth on the side opposite the bar-engaging portion of the tooth, said clip having two arms engaging the said bar and having portions engaging the sides of the tooth to prevent lateral movement of the same, substantially as described.

6. In a harrow, the combination, with an angle-bar, of a tooth having a portion adapted to fit the re-entrant angle of the bar, a clip adapted to engage the tooth and having arms entering recessed portions of the bar and engaging the sides of said tooth, and securing means for holding said bar, tooth, and clip together, substantially as described.

In testimony whereof I affix my signature in presence of two witnesses.

PAUL BLAKER.

Witnesses:
L. P. WHITAKER,
J. D. KINGSBERY.